PASSIVE BROADBAND FREQUENCY MULTIPLIER

Filed March 15, 1963 5 Sheets-Sheet 1

INVENTORS
CLAUDE C. ROUTH
MILTON D. PAPINEAU
BY
ATTORNEYS

INVENTORS
CLAUDE C. ROUTH
MILTON D. PAPINEAU
BY
ATTORNEYS

INVENTORS
CLAUDE C. ROUTH
MILTON D. PAPINEAU
BY
ATTORNEYS

PASSIVE BROADBAND FREQUENCY MULTIPLIER

Filed March 15, 1963

INVENTORS
CLAUDE C. ROUTH
MILTON D. PAPINEAU
BY
ATTORNEYS

PASSIVE BROADBAND FREQUENCY MULTIPLIER

Filed March 15, 1963 5 Sheets-Sheet 5

INVENTORS
CLAUDE C. ROUTH
MILTON D. PAPINEAU
BY
ATTORNEYS

United States Patent Office 3,296,517

Patented Jan. 3, 1967

3,296,517

PASSIVE BROADBAND FREQUENCY MULTIPLIER

Claude C. Routh, San Diego, Calif., and Milton D. Papineau, Kailua, Hawaii, assignors to the United States of America as represented by the Secretary of the Navy Filed Mar. 15, 1963, Ser. No. 265,566
19 Claims. (Cl. 321—1)

The invention described herein may be manufactured and used by or for the Government of the United States of America for governmental purposes without the payment of any royalties thereon or therefor.

The present invention relates generally to frequency multipliers and in particular is a method and means for multiplying the frequency of a signal by eight over a broad frequency range without adversely effecting the waveform thereof.

In the past, frequency multiplication normally has been accomplished by passing the signal to be multiplied through a non-linear element, thereby creating harmonics mathematically expressable by a Fourier series. Any of the resulting plurality of frequencies of said harmonics may be sorted out by appropriate filter tuning; however, the level thereof ordinarily falls off rapidly as the multiple of the frequency chosen increases. Consequently, present multipliers are inherently narrow band devices. The Q present in most tuned circuits causes an amplitude build-up time which is inordinately long so that the signal to be multiplied must be of sufficient duration or else considerable amplitude is lost. Moreover, in order for this loss to be small, it is necessary for several cycles of the input signal to be present so that the two, optimumly required for tuning purposes, must employed. In addition, in the ordinary method of multiplication, there is a large loss of energy, since the multiplying circuit is tuned to a harmonic. Distortion of most waveforms and in particular most sinewave forms creates only a small percentage of its energy in harmonics and a particular portion of any given harmonic usually decreases rapidly as the higher harmonics are chosen. Being narrow band devices, the prior art multipliers can, therefore, retain only the relatively low frequency modulations of a signal; otherwise, sidebands from the multiplication will not be near enough to the multiplied carrier frequency to properly pass through the tuned filter. Also, the delay due to build-up time is objectionable in cases where it is necessary to have an output signal present near the beginning of the input signal.

For most practical purposes, the instant invention overcomes the objectionable features of the prior art by using a multiplying factor which is determined by the number of phases in a polyphase signal that has been developed from a single phase input signal rather than from the harmonic thereof. Although the subject invention is not intended to supplant the common multipliers of the prior art, since they are obviously of use in numerous applications, it is intended to provide substantially optimum performance as far as signal frequency multiplication is concerned in those applications requiring wideband operations, phase-locked or synchronized input-output designs, and outputs varying linearly in amplitude with the input amplitude. Furthermore, in some instances it may also act as a modulator of a type which eases the output filtering problem considerably.

It is therefore, an object of the present invention to provide an improved frequency multiplier;

Another object of this invention is to provide an improved broadband frequency multiplier by eight;

Still another object of this invention is to provide an improved passive signal frequency multiplier;

A further objective of this invention is to provide an improved method and means for multiplying the frequency of ping-type signals of only a few cycles duration as well as C.W. or interrupted C.W. signals that are employed in various and sundry sonar and other electronic devices;

A further objective of this invention is to provide a method and means for multiplying the frequency of a single cycle signal having a rapid rise time;

Still another object of this invention is to provide an improved signal frequency multiplier having a level of output that is a predetermined function of the level of the input signal thereto;

Another object of this invention is to provide a signal frequency multiplier having an output signal phase that is locked or synchronized with the phase of the signal applied thereto;

Another object of the instant invention is to provide a signal frequency multiplier having an improved build-up time to full output;

Another object of this invention is to provide a method and means for multiplying the frequency of an electrical signal while preserving the envelope thereof or the modulation thereon with a relatively high degree of fidelity;

Still another object of this invention is to provide an nal frequency multiplier having phase stability and a lower Q than has been achieved heretofore;

Still another object of this invention is to provide an improved method and means of multiplying the frequencies of a plurality of signals within a predetermined broad frequency band simultaneously;

A further objective of this invention is to provide a method and means for accurately multiplying the frequency of a predetermined sinusoidal signal by eight;

Still another object of this invention is to provide a method and means of multiplying the frequency of a predetermined signal within a broad frequency range by employing a multiplying factor that is determined by the number of phases in a polyphase signal which has been developed from a single phase signal;

A further objective of this invention is to provide a method and means for multiplying two frequencies while retaining their difference frequency as a modulation thereof;

Another object of this invention is to provide a broadband frequency multiplier that is comparatively small physically and not excessively complex electronically;

Still another object of this invention is to provide a passive broadband frequency multiplier which is easily and economically manufactured and maintained;

Other objects and many of the attendant advantages of this invention will be readily appreciated as the same becomes better understood by reference to the following detailed description when considered in conjunction with the accompanying drawings in which like reference numerals designate like parts throughout the figures thereof and wherein.

Figure 5:
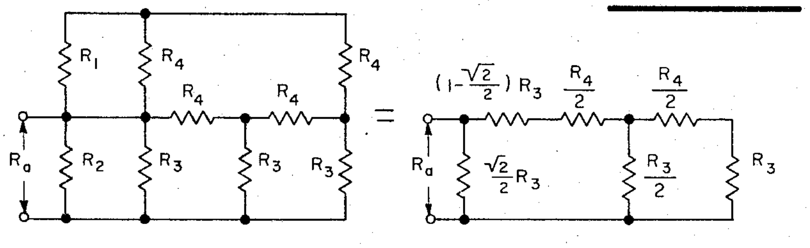
Figure 6:
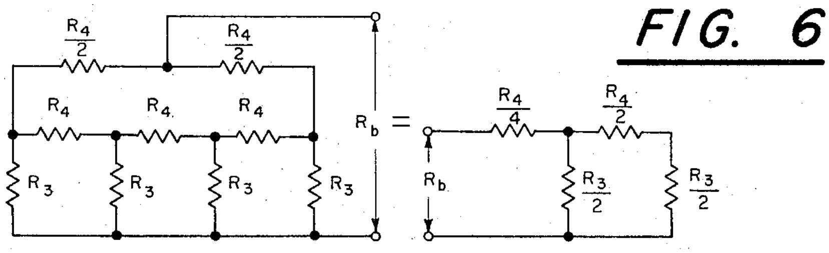
Figure 7:
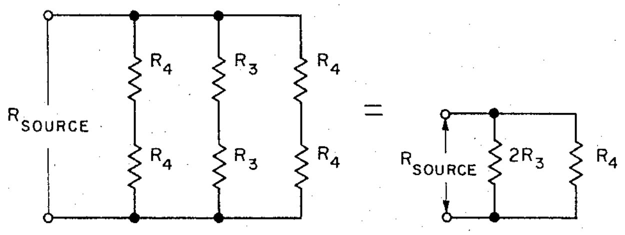

FIGS. 5, 6, and 7 are equivalent circuit representations which facilitate the design of the resistance network constituting the two phase to polyphase network incorporated in the present invention.

Figure 8:
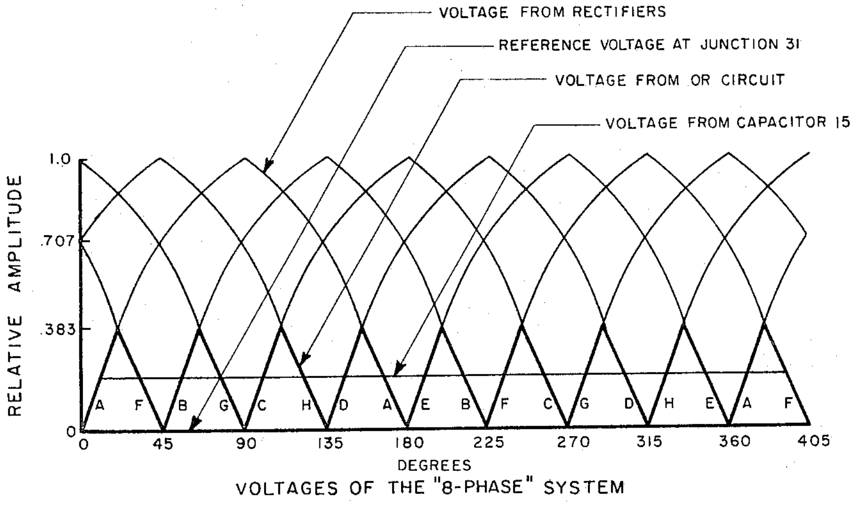

FIG. 8 is a graphical representation of the relative voltage amplitude vs. phase in degrees for an eight phase system with emphasis on the triangular voltage output from the "OR" circuit.

Figure 9:
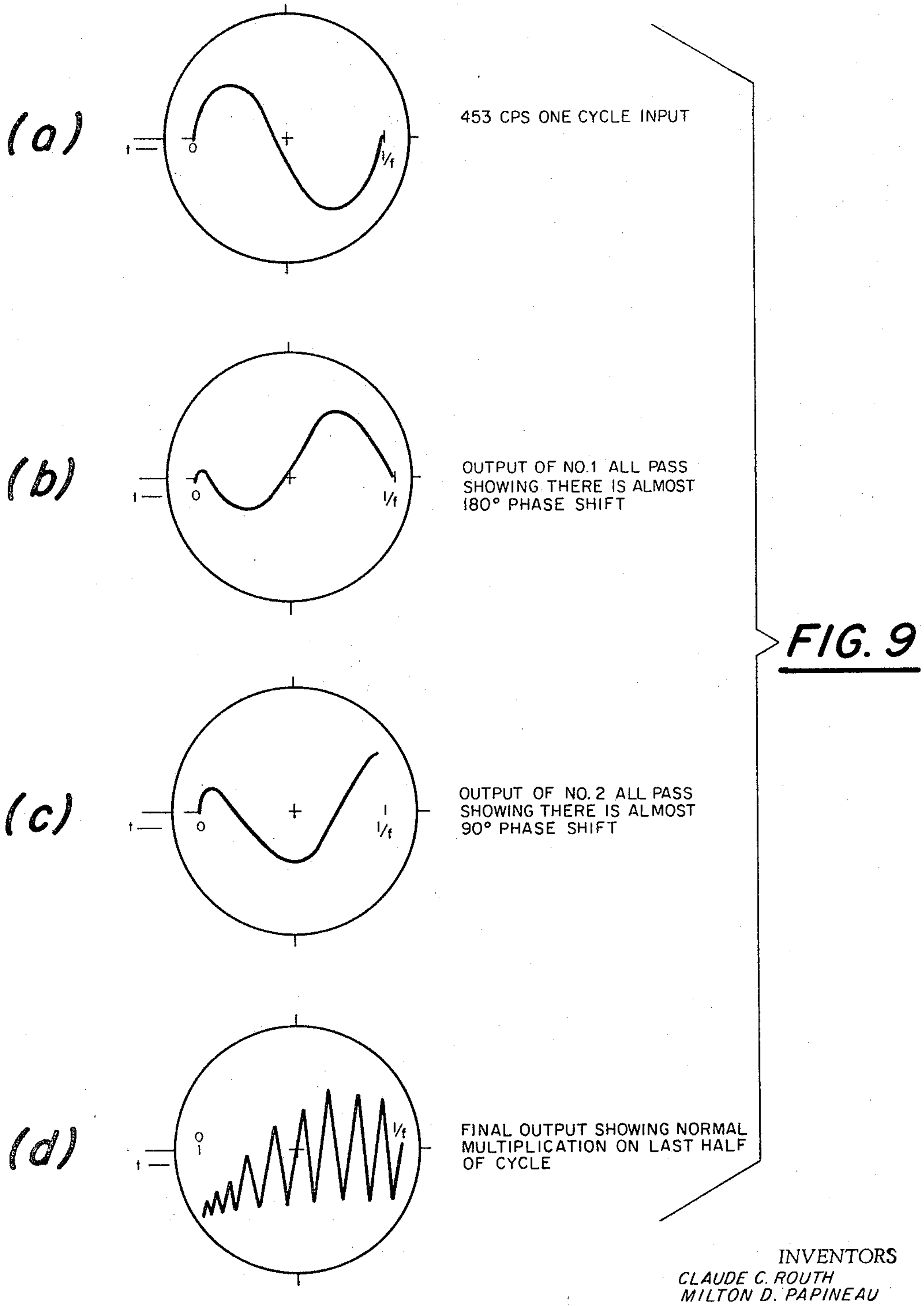

FIG. 9 depicts oscilloscope waveforms at various pick-off voltage points within the invention.

Figure 1:
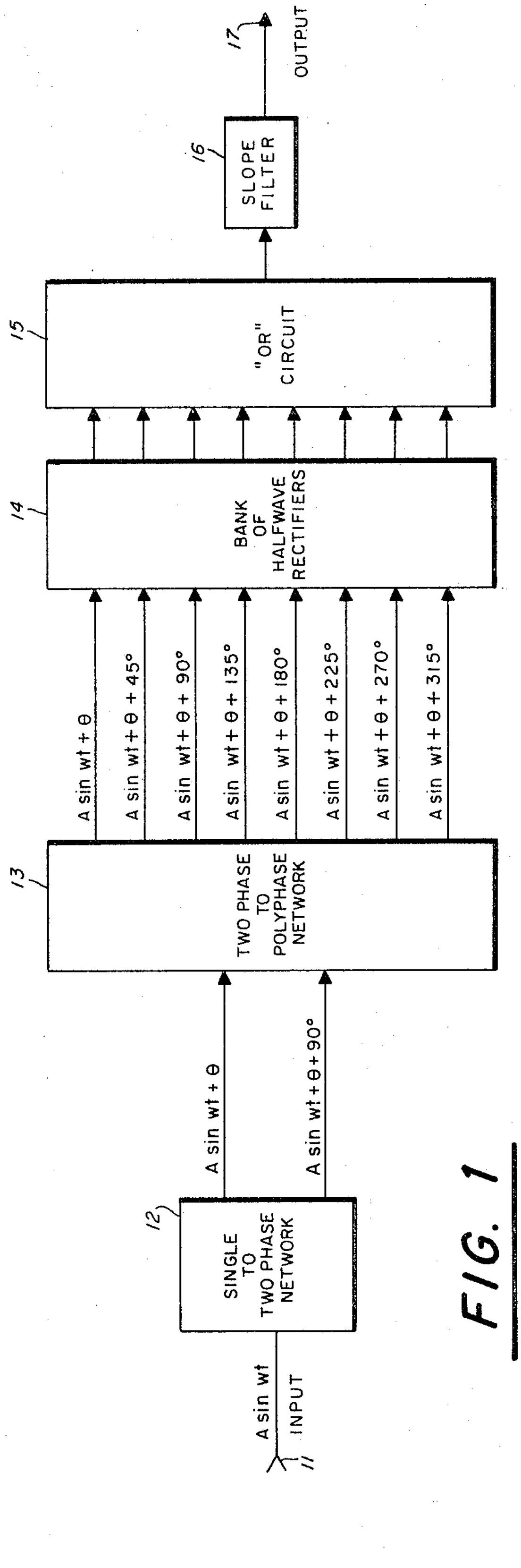
FIG. 1 is a block diagram representation of the subject invention which also illustrates the respective phase conversions in a multiply-by-eight system.

Referring now to FIG. 1, an input terminal 11 is used to receive the signal to be multiplied. In this particular case, the preferred embodiment of the subject signal frequency multiplier is a multiplier by eight but, of course, it should be understood that other multiplication factors such as, for instance, multiplication by four or multiplication by sixteen, or any other desired multiplication by a whole number may be obtained by making design choices which would be obvious to one skilled in the art having the benefit of the teachings herein disclosed.

For the purpose of simplifying this disclosure, an input sinewave signal defined as $A$ sin $wt$ will be considered as an exemplary input to the subject invention. This input signal is applied to a single to two-phase network 12 having a pair of outputs respectively defined as $A$ sin $wt$ plus $\theta$ and $A$ sin $wt$ plus $\theta$ plus 90°. These two outputs are then applied to a two phase to polyphase network 13 which has a plurality of outputs defined respectively as $A$ sin $wt$ plus $\theta$, $A$ sin $wt$ plus $\theta$ plus 45°, $A$ sin $wt$ plus $\theta$ plus 90°, $A$ sin $wt$ plus $\theta$ plus 135°, $A$ sin $wt$ plus $\theta$ plus 180°, $A$ sin $wt$ plus $\theta$ plus 225°, $A$ sin $wt$ plus $\theta$ plus 270°, and $A$ sin $wt$ plus $\theta$ plus 315°. The exemplary eight outputs of two phase to polyphase network 13 are applied as inputs to a respective bank of half-wave rectifiers 14, the outputs of which are fed to an "OR" circuit 15. The output of "OR" circuit 15 is processed through a slope filter 16 before becoming the output signal; that is, the signal having a frequency which is eight times that of the original input signal and which is available at an output terminal 17 for use by any appropriate utilization equipment. Although the uses or applications of the subject invention is practically unlimited, one particular use that has been found to be eminently satisfactory is in connection wtih sonar apparatus.

Figure 2:
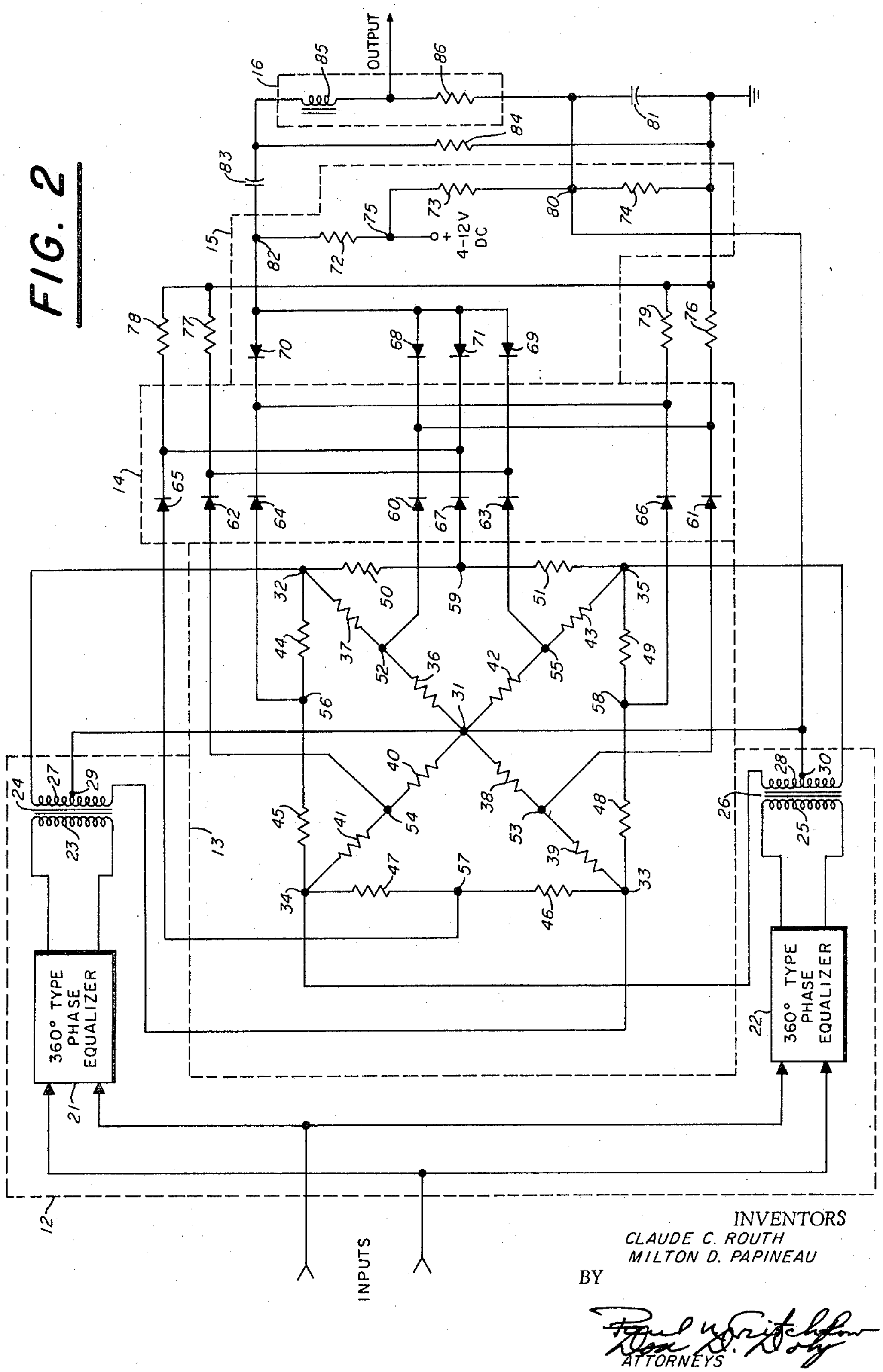
FIG. 2 is a more detailed configuration of the block diagram of FIG. 1.

Referring now to FIG. 2, a more detailed representation of the embodiment of the subject invention depicted in block diagram form in FIG. 1 is shown. In order to facilitate presenting a clear teaching of the elements and groups of elements corresponding to those represented by the blocks of FIG. 1, the equivalent thereof is shown in their respective dotted line arrangements and similarly numbered accordingly. The input is simultaneously applied to the proper inputs of a pair of 360° type phase equalizers 21 and 22. Said phase equalizers are also sometimes known as 360° all-pass filters or lattice networks in the art; however, further disclosure of a phase equalizer which is preferable for use in these instances will be discussed subsequently in connection with another figure showing a detailed representation thereof. The outputs of phase equalizer 21 are applied to a primary winding 23 of a transformer 24 and, likewise, the outputs of phase equalizer 22 are applied to a primary winding 25 of a transformer 26. Transformers 24 and 26 both have secondary windings 27 and 28, respectively, each of which is center tapped at 29 and 30, respectively. As can be readily seen, the structure constituting phase equalizers 21 and 22 and their associated transformers 24 and 26 constitutes the aforementioned single to two-phase networks 12 mentioned above.

The center taps of secondary windings 27 and 28 of transformers 24 and 26, respectively, are interconnected and also connect to the center junction point 31 of a resistance bridge network constituting the aforesaid two-phase to polyphase network 13. The other terminals of said secondary windings 27 and 28 are likewise connected to respective junctions 32 through 35 of the two-phase to polyphase resistance network 13. Coupled between electrical junctions 31 and 32 are a pair of series connected resistors 36 and 37, and coupled between electrical junctions 31 and 33 are a pair of series connected resistors 38 and 39. Likewise, coupled between electrical junctions 31 and 34, are a pair of series connected resistors 40 and 41, and coupled between electrical junctions 31 and 35 are a pair of series connected resistors 42 and 43. Connected between electrical junctions 32 and 34 are a pair of series connected resistors 44 and 45, connected between electrical junctions 33 and 34 are a pair of series connected resistors 46 and 47, connected between electrical junctions 33 and 35 are a pair of series connected resistors 48 and 49, and connected between electrical junctions 32 and 35 are a pair of series connected resistors 50 and 51. For the sake of clarity and convenience regarding the various junctions and their respective voltages when same are being discussed subsequently in connection with the operation of the subject invention, the electrical junctions of the aforesaid resistors 36 and 37 are referenced as junction 52, the junction of the aforesaid resistors 38 and 39 is referenced as junction 53, the junction of the aforesaid resistors 40 and 41 is referenced as junction 54, the electrical junction of the aforesaid resistors 42 and 43 is referenced as junction 55, the electrical junction of the aforesaid resistors 44 and 45 is referenced as junction 56, the electrical junction of the aforesaid resistors 46 and 47 is referenced as junction 57, the electrical junction of the aforesaid resistors 48 and 49 is referenced as junction 58, and the electrical junction of the aforesaid resistors 50 and 51 as referenced as junction 59.

Respectively connected to electrical junctions 52 through 59 are diodes 60 through 67, which, when considered collectively, constitute the aforementioned bank of halfwave rectifiers 14.

The output of diodes 60 and 61 are interconnected and also connected to the output of a diode 68. The outputs of diodes 62 and 63 are interconnected and connected to the output of a diode 69. The outputs of diodes 64 and 66 are also interconnected and coupled to the output of a diode 70. The outputs of diodes 65 and 67 are likewise interconnected and coupled to the output of a diode 71. The inputs of said diodes 68 through 70 are connected together and through a trio of resistors 72, 73, and 74 to ground. An electrical junction 75 between resistors 72 and 73 has a positive voltage applied thereto of the order of 4 to 12 volts D.C. Said diodes 68 through 71 and associated series connected resistors 72 through 74, of course, constitute the aforesaid OR circuit 15.

Each of the outputs of diodes 61, 62, 65, and 66 are respectively connected through resistors 76 through 79. Center tap 30 of secondary winding 28 of transformer 26 is also connected to an electrical junction 80, which is the interconnection junction between the aforementioned resistors 73 and 74. A capacitor 81 is connected in parallel with said resistor 74. At an electrical junction 82 between OR circuit diodes 68 through 71 and one terminal of resistor 72 is connected to one plate of a capacitor 83, the other plate of which is connected through a resistor 84 to ground. Said other plate of condenser 83 is likewise coupled through an inductance 85 and a resistor 86 to said electrical junction 80. Inductance 85 and resistor 86, as they are so connected in series, constitute the aforementioned slope filter 16. The output from the subject invention, of course, is taken from the junction interconnecting said inductance 85 and resistor 86.

Figure 3:
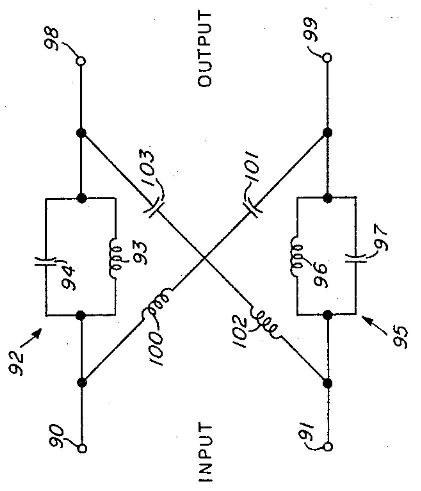
FIG. 3 is a schematic representation of an all pass filter that may be incorporated in the devices of FIGS. 1 and 2.

FIG. 3 depicts an exemplary section of the phase equalizers which may be used as phase equalizers 21 and 22 mentioned above. The input signal thereto is applied to input terminals 90 and 91, either one of which may be grounded or left floating as desired. Input terminal 90 is connected to an LC tank circuit 92 consisting of an inductance 93 connected in parallel with a capacitor 94. Likewise, input terminal 91 is connected to an LC tank circuit 95 consisting of an inductance 96 and a capacitor 97 connected in parallel therewith. The outputs of LC tank circuits 92 and 95 are respectively coupled to output terminals 98 and 99 in this particular exemplary embodiment of the phase equalizer. Between input terminal 90 and output terminal 99 there is coupled a series LC circuit consisting of an inductance 100 connected in series with a capacitor 101. Likewise, between input terminal 91 and output terminal 98, anothher series LC circuit consisting of inductance 102 and capacitor 103 is connected.

Although only one stage of the phase equalizer is shown in FIG. 3, it should be understood that two or more thereof may be cascaded together in order to form the total all-pass filter or phase equalizer as desired for any given signal frequency multiplication over a wider band or as may be necessary during any given operation circumstances. To effect such a phase equalizer it would, of course, be obvious to the skilled artisan that the cascaded arrangement may be obtained by connecting the inputs of successive phase equalizer sections to the outputs of its respective immediately preceding phase equalizer section.

The operation of the subject invention will now be discussed in connection with FIGS. 1 through 9.

This invention is actually a solution to the problem of frequency multiplying of one or more electrical signals within a wide band of frequencies and, in particular, enables multiplication of gated sinusoid signals, C.W. signals, or pings such as might be employed in sonar systems and which might also appear within said wideband of frequencies. In order to obtain wideband frequency multiplication, it was realized that a new approach to the problem must be made. This approach resulted in the creation of a polyphase signal from a single phase signal, followed by appropriate halfwave rectification thereof, and then further processing by following the modulation "ripple" with an OR circuit and slope filter in order to provide an output which would be useful in numerous applications. It was found that a much less distored wave of greater amplitude could be created if the polyphase signal was half-wave rectified and the voltage of whichever phase legs rectified voltage was least positive was followed and selected by said OR circuit.

Considering now the operation of each of the individual components, a discussion thereof as follows will be made with respect to the structural devices of FIGS. 1, 2 and 3 which, of course, constitute a preferred embodiment of the subject invention but which should be considered as being exemplary only, inasmuch as one skilled in the art having the benefit of the teachings herein presented could obviously design frequency multipliers having a multiplication factor other than that of eight.

If an input electrical signal having any particular waveform such as, for example, a waveform mathematically defined by $A \sin wt$ is applied to single to two phase networks 12, it will be converted from a single phase signal to a two-phase signal over a very wide band of frequencies. In this particular case, the technique of employing 360° phase equalizers, or 360° all-pass filters as they are sometimes called, is used. The input signals are, therefore, applied to phase equalizers 21 and 22 where the single to two phase conversions take place in such a manner that regardless of the frequency of the input signal the outputs of phase equalizers 21 and 22 are, within tolerable limits, at 90° phase relationship to each other. To effect this conversion, phase equalizers 21 and 22 contain similar electrical components; however, the design of said components as far as respective values are concerned must be such that said 90° phase relationship results in their outputs.

As previously mentioned, the lattice resistance network shown in FIG. 3 is an exemplary representation of the structure that may be employed in both phase equalizers 21 and 22. Such lattice networks have a passband whenever the impedance $Z_a$ across the LC tank circuit and the impedance $Z_b$ across the diagonal LC circuit have opposite signs, as in parallel versus series LC circuits which are tuned to the same frequency. In this instance, for example, $Z_a$ would be considered as being the impedance of a shunt arm comparable to said parallel LC circuit and $Z_b$ would be considered as being the impedance of a cross arm comparable to the aforesaid series LC circuit. In this case, the attenuation constant is zero, the image impedance is a resistance, and the phase shift $\theta$ may be obtained from the equation $$\tan\frac{\theta}{2}=-J\sqrt{\frac{Za}{Zb}} \qquad (1)$$

Furthermore, if $Z_a$ and $Z_b$ are made reciprocal impedances relative to a load R, that is, $$Z_aZ_b=R^2 \qquad (2)$$

then the input and output impedance is the load resistance R for all frequencies and the passband includes all frequencies. In this particular case, of course, said load resistance R would actually be that load resistance which is obtained from the primary windings 23 and 25 of transformers 24 and 26 as they are reflected back to their respective phase equalizers 21 and 22. If Equation 2 is substituted in Equation 1, the equation $$\tan\frac{\theta}{2}=-J\frac{R}{Z_b}=-J\frac{Z_a}{R} \qquad (3)$$

which represents the equation from which the aforesaid phase vs. frequency slope may be derived, since J is an imaginary number.

The value of $Z_a$ (or $Z_b$) for a chosen load resistance R that gives a logarithmetic or other suitable phase $\theta$ versus frequency characteristics is best visualized by introducing a design parameter $af_0$ where $a$ is some constant divided by $f_0$ and $f_0$ is the frequency where $\theta$ equals $-180°$. The curves of any of the infinite number of phase versus $f/f_0$ characteristics can be depicted graphically and is exemplarily represented by one of the curves of FIG. 4 for design convenience.

Since $$\tan\frac{\theta}{2}=-\infty \text{ for } \theta=-180°$$

it can be seen from (3) that $Z_b=0$ and $Z_a$=infinity at $f_0$, load resistance R being a fixed constant and finite.

Having established these relationships, it can be shown that the values for inductance and capacitor components involved may be calculated as follows if it is assumed that:

Inductors 93 and 96 each have an inductance $L_1$,
Capacitors 94 and 97 each have a capacitance $C_1$,
Inductors 101 and 102 each have an inductance $L_2$,
Capacitors 101 and 103 each have a capacitance $C_2$,
The respective primary transformer winding has a load resistance R, and
The primary winding of transformers 24 and 26 have an impedance Z equal load resistance R.

Then, $$L_1=\frac{aR}{2\pi} \qquad (4)$$

$$C_1=\frac{1}{f_0^2 2\pi aR} \qquad (5)$$

$$L_2=R^2C_1=\frac{R}{2\pi af_0^2}=\frac{L1}{(af_0)^2} \qquad (6)$$

$$C_2=\frac{L_1}{R^2}=\frac{a}{2\pi R}=C_1(af_0)^2 \qquad (7)$$

$$R=\frac{\sqrt{L_1}}{\sqrt{C_2}} \qquad (8)$$

Figure 4:
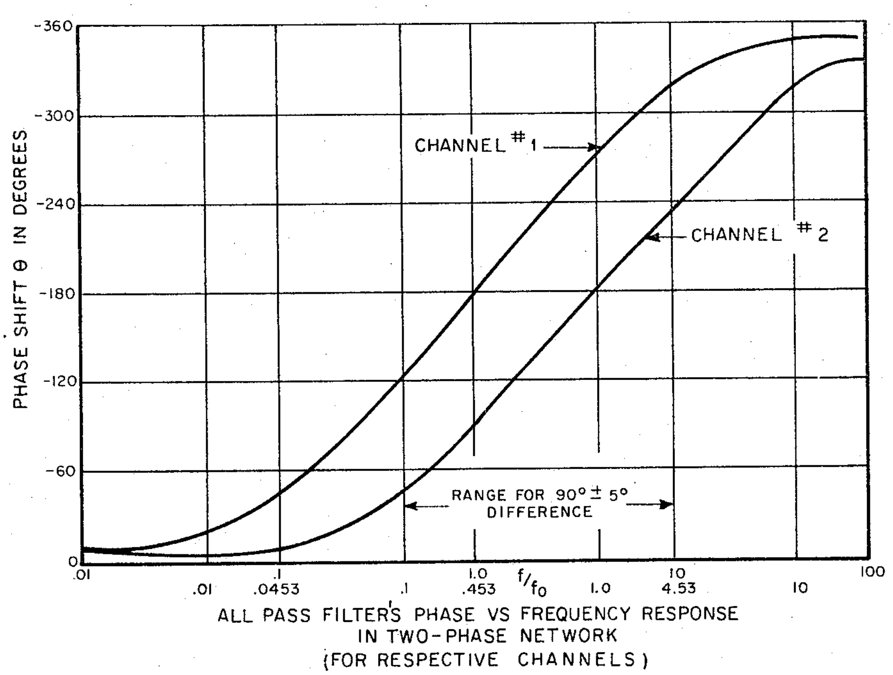
FIG. 4 is a graphical representation of the phase response of the respective sections of a two-phase network for various design parameters.

Then the inductance and capacitance circuit elements are expressed in the terms $$\tan\frac{\theta}{2}=\frac{-af_0(f/f_0)}{1-(f/f_0)^2} \quad (9)$$

and FIG. 4 gives a graphic representation of $af_0$ curves plotted from the $\theta$ and $f/f_0$ in terms of Equation 9. Actually, a family of curves may be drawn using Equation 9, but inasmuch as only two phase equalizers are required, for the operation of the subject invention, only two curves have been shown, one of which represents the curve of phase equalizer 21 and the other of which is intended to represent the curve of the phase equalizer 22. As can be seen, within the useful range designated as the range for 90° plus or minus 5° difference, the two curves are substantially straight lines paralleling each other and having a 90° relative phase relationship. Thus, if the foregoing technique is used, the respective values of the capacitors and inductances incorporated in phase equalizers 21 and 22 may be derived in such manner that their respective outputs will have a relative phase relationship of 90°, regardless of the frequency of the input signal.

However, as a matter of practicality, it should be understood that the choice of phase equalizer design parameters depends heavily upon the allowable deviation from 90° in the two phase system and the multiplier band width over which this deviation can take place with only negligible consequence as far as accuracy is concerned.

Once having a pair of signals that are 90° apart, signals in the other quadrants may be developed by means of transformers or phase splitters if so desired, to yield a balanced circuit. In this particular case transformers 24 and 26 were employed and their center taps 29 and 30 of secondary windings 27 and 28 respectively were tied together to provide a common voltage reference. Thus the outputs from transformers 24 actually are four 90° spaced vectors. These outputs are sufficient for a multiplier by four. The alternate four 90° spaced outputs are preferred however, if phase accuracy is required—the phase being maintained at exactly 90° separation even for two phase input signal phase error. The phase relations for higher multipliers must be obtained by further processing by the technique of resistance mixing. The multiplier by eight which is the preferred embodiment herein shown, for instance, develops eight signals spaced 45° apart, from a successive phase relationship standpoint. For a better understanding of this technique, reference is now made to the detailed resistance divider network shown in FIG. 2 which actually constitutes the two phase to polyphase network 13 of FIG. 1. It is noted that in this resistor divider network the resistance between the inputs are separated 90° in phase and that they have a linear gradient of voltage along them. A midpoint in each of the four cases was chosen as a pick-off voltage point with a load sufficiently high in resistance that it draws relatively little current. At these midpoints, the voltages always follow half way between the voltages of the two waveforms which are separated by 90°. These resulting voltages are waveforms which each have a phase half way between the phases of the two 90° waveforms and, thus, are separated 45° from each other and .707 of either amplitude if the two 90° waveforms were of equal amplitude. This means that to obtain the correct amplitude so that all eight vectors have equal amplitudes in the resultant vector, one must tap down to .707 of the input vector's amplitude. As an example of this it can be shown in the resistance leg of resistant divider network 13 containing resistors 50 and 51 that the resultant signal vector at junction 59 is the vector sum of the signal vectors at junctions 32 and 35, which are 90° separated in phase, divided by two. In other words, the voltage of electrical junction 59 follows a voltage half way between junctions 32 and 35. Since the voltages at junctions 32 and 35 are equal, the resultant signal vector is 45° separated from the signal at either junction 32 or 35 and is .707 of either magnitude.

It should be noted at this time, that properly selected transformers could be used to replace the resistances of the subject two phase to polyphase network 13 if so desired and that so doing would probably result in somewhat less loss of power. Furthermore, as will be explained subsequently, higher multiplication values may be obtained by using similar but more complex resistance mixing networks, and in view of the teachings herein presented, so doing would obstensively be obvious to one skilled in the art.

The relative resistance values for the divider network of the eight phase system shown herein may be obtained by using the following procedure:

Letting, $R_a$=the resistance of resistor 42.
$R_b$=the resistance between electrical junctions 31 and 59.
$R_1$=the resistance of resistor 41.
$R_2$=the resistance of resistor 40.
$R_3$=the total resistance of resistors 40 and 41.
$R_4$=the total resistance of resistors 44 and 45.

The first consideration now is to make $R_a$ equal to $R_b$, since these are the output impedances for driving the diode networks to follow. The equal source impedances make it such that the diodes and associate circuitry causing the loading thereof all tend to receive equal voltages. This resulting load impedance, of course, may be neglected in computing the divider network impedance, since it is very high in comparison therewith. For this purpose, ordinarily, said circuitry impedance should be much greater than ten times the resistance of resistor 42. To obtain equal voltages from junctions 52 and 59 and their counterparts, a tapping down procedure is used and $$R_2=\frac{\sqrt{2}}{2}R_3$$

To solve for $R_a$, the resistance divider circuit can be broken down as is shown in FIG. 5 due to symmetry. Remembering, $$R_1+R_2=R_3$$

$$R_1=\left(1-\frac{\sqrt{2}}{2}\right)R_3$$

$$R_2=\frac{\sqrt{2}}{2}R_3$$

where $R_a$ is expressed in terms of $R_3$ and $R_4$. Then let $R_3$ equal $k$ $R_4$, where $k$ is a constant. This yields:

$$R_a=R_4\left[\frac{(4\sqrt{2}-3)k^3+(3\sqrt{2}-1)k^2+\left(\frac{\sqrt{2}}{2}\right)k}{8k^2+6k+1}\right]$$

To solve for $R_b$, the circuit is broken down as in FIG. 6. Since by symmetry there is no voltage drop across the central resistance $R_4$, it may be neglected because it may be considered to be infinite. This, when expressed in terms $k$ and $R_4$, yields $$R_b=R_4\left(\frac{2k^2+4k+1}{8k+4}\right)$$

Equating $R_a$ to $R_b$, $$\frac{(4\sqrt{2}-3)k^3+(3\sqrt{2}-1)k^2+\left(\frac{\sqrt{2}}{2}\right)k}{8k^2+6k+1}\ \frac{2k^2+4k+1}{8k+4}$$

or $$(32\sqrt{2}-40)k^4+(40\sqrt{2}-64)k^3+(16\sqrt{2}-38)k^2+(2\sqrt{2}-10)k-1=0$$

the roots of which are very difficult to obtain, but, for all practical purposes, the above equation may be solved with sufficient accuracy by approximations using Horner's Method. The result to two places is 2.7 for $k$. Normalizing by setting $R_4$ equal to 1 ohm and using $k$ equal to 2.7, the accuracy of this value is checked. Substitution in the original formulas give $R_a=1.03R_4$ and $R_b=1.03R_4$, so the value for $k$ is probably good to three places, in view of the fact that it has been shown that it makes $R_a$ equal to $R_b$ to three decimal places.

The next matter to be considered is the finding of the load which the resistance divider network offers to the source in terms of $R_3$ and $R_4$. Each source works into the equivalent circuit of FIG. 7, where half of the $R_3$ resistances are omitted because they are considered to be infinite because there is no voltage drop across them from the source under consideration, due to symmetry of the resistance network. This resistance divider network load may be calculated by $$R \text{ source}=\frac{2R_3R_4}{2R_3+R_4}$$

If $R_4$ is made to equal 1 ohm and all other resistances are calculated relative to it, then $2R_3=2k$, since $R_3=kR_4$, and the source resistance is $$\frac{2k}{1+2k}$$

which for $k$ equal to 2.70 is .844 ohm. To set the source resistance to one ohm, for convenience, multiplication by the reciprocal of .844 or 1.184 is used. This gives 2.7 times 1.184 or 3.197 ohms for the resistance of $R_3$ and 1.184 ohms for the resistance of $R_4$. The output impedances are equal to 1.03 times $R_4=1.23$. For any other source resistance, these values are simply multiplied by the ratio of the desired load resistance to one ohm.

As can readily be seen, eight output signals occur from the resistance divider network constituting the two phase to polyphase network 13 and each of these output signals are 45° phased or are successively 45° out of phase with its immediately preceding signal. These eight signals are then applied to their respective diodes of the bank of half-wave rectifiers 14 mentioned above. It was determined that a much less distorted wave of greater amplitude could be obtained if the polyphase signal were rectified and the least positive voltage thereof followed, rather than following the "ripple" modulation (most positive voltage). Examples of the waveforms of such voltages as they appear at the outputs of their respective amplifiers, their respective "OR" circuits, and the voltage out of capacitor 83, or indicated with respect to a given reference voltage taken at junction 31 of the resistance divider network are depicted in FIG. 8. As can be seen, the waveform in the output would be nearly triangular and, thus, the main distortion, if any, would be the third harmonic which would be down about 17 db from the fundamental frequency. Subsequent processing of the output signal of "OR" circuit 15 by slope filter 16, of course, removes most of this third harmonic distortion. On the other hand, in event that the subject invention is operated at less than a three-to-one band; that is say, for example, one to three kilocycles per second, the waveform at the output is substantially similar to the waveform of the input, rather than being triangular in form. Hence, if said input waveform is a sinewave, the output waveform would likewise be a sinewave. But, some distortion is ordinarily permissible in most practical applications of the subject invention, so that a slope filter may be used to a considerable advantage, in that the band of operation obtained becomes more broadband.

FIG. 9 illustrates oscilloscope pictures of signal waveforms as they travel through the invention. For example, FIG. 9*a* illustrates a typical sinewave that may be employed as the input thereto. FIG. 9*b* shows that said sinewave has received approximately a 90° phase shift as a result of its being processed by one of the phase equalizers. Likewise, FIG. 9*c* shows that said sinewave has received approximately 180° phase shift as a result of its being processed by the other of said phase equalizers. Of course, FIG. 9*d* shows that the final output has obtained normal multiplication by the time of the last half of the cycle. Hence, since it may be noted that the input in this particular illustration was a single cycle and that the rise time of the subject system was sufficiently fast to actually effect multiplication of said single cycle input signal. This, of course, is an exceedingly desirable advantage and this coupled with the fact that the invention is inherently broadband in nature, makes it an important and very useful contribution to the frequency multiplier art.

Although the foregoing disclosure employed a single sinewave input as the input to the subject invention, it should be understood that two or more sinewaves may be simultaneously applied as inputs thereto. Furthermore, as a matter of fact, other more complex waveforms may also be applied thereto for frequency multiplication purposes. Hence, even the complex waveform of so-called "white noise" may be applied to the subject invention for multiplication of the frequencies thereof.

The action on the subject frequency multiplier device on noise does not lend easily to a rigorous mathematical development. However, some reasonable conclusion can be obtained based on two and three signal frequency input tests. The all-pass filters developed most of the noise into two signals 90° out of phase, similar to that indicated by the Lissajou pattern of the oscilloscope output of FIGS. 9*b* and 9*c*. The pattern is circular but of random varying diameter representing amplitude change. The action of the resistor network is to take the noise of this two phase system and produce eight outputs of noise which are 45° phase displaced just as are the eight outputs for any predetermined discrete frequency input signal. Noise can be expressed in an equivalent form by a Fourier series of sinewaves of varying amplitudes which are superimposed upon each other. Ostensively then, the mixing of two equal noise signals, except for a 90° phase relation, would then result in a 45° phase related signal with 1.4 times the amplitude, just as in mixing two sinewaves 90° apart, when they are of the same level. Since in the "OR" circuit the least positive voltage is followed, it would be expected that the signals of the highest level and frequency would predominate in determining the output frequencies. This can be graphically understood by referring to FIG. 8. With respect to noise processing, products are produced and these products are greater in number and have greater energy the closer they are to the center of the band, thereby causing a triangular distribution over the multiplier's output band. The amplitude of the noise in the difference frequency band when two discrete frequencies are present in the noise at the input has a positive slope from the highest difference frequency contribution down to zero. In other words, half of a triangular area describes the noise energy over the difference frequency band. The curve in the rectifying diodes of this frequency multiplier has a logarithmic characteristic when plotted against voltage. The transfer function characteristic of the multiplier is non-linear and approaches that of square-law so that the noise output has a triangular distribution for a flat distribution or "white noise" input.

All in all, it should be understood, that the subject invention multiplies the frequency of an input signal with sufficient accuracy for most practical purposes, regardless of whether or not that input signal is a single sinewave, a plurality of simultaneously applied sinewaves, a plurality of predetermined complex waveforms, or white noise, and that the processing thereof therein is effected.

As was previously mentioned, only a multiply-by-eight system has been disclosed herein as the preferred embodiment of the subject invention; however, it should be readily understood that other multiplication factors may be similarly employed and that so doing would be well within the purview of one skilled in the art having the benefit of the teachings herein presented. Hence, a four-to-one ratio may be obtained, or a sixteen-to-one ratio may be obtained, or other preferred ratios may be obtained as necessary to meet the requirements of any given operational circumstances.

Obviously, many modifications and variations of the present invention are possible in the light of the above teachings. It is, therefore, to be understood that within the scope of the appended claims the invention may be practiced otherwise than specifically described.

What is claimed is:

1. A passive broadband frequency multiplier comprising in combination, means for receiving an electrical signal and producing a pair of output signals therefrom having a predetermined relative phase relationship, means coupled to said last mentioned producing means for converting said pair of output signals into a plurality of polyphase signals having a predetermined relative phase relationship, means coupled to said last mentioned converting means for rectifying each of said plurality of polyphase signals, and means connected to said rectifying means for producing a single continuous signal in accordance with the least positive one of said plurality of rectified polyphase signals.

2. The device of claim 1 wherein said means for receiving an electrical signal and producing a pair of output signals therefrom having a predetermined relative phase relationship comprises, a pair of three hundred sixty degree phase equalizers each of which include, a first tank circuit having an inductance and a capacitance connected in parallel therewith, a second tank circuit having an inductance and a capacitance connected in parallel therewith, a first series network having an inductance and a capacitor connected in series therewith, a second series network having an inductance and a capacitor connected in series therewith, said first and second series networks being connected between the input of said first tank circuit and the output of said second tank circuit and the input of said second tank circuit and the output of said first tank circuit respectively.

3. The device of claim 1 wherein said means coupled to said last mentioned producing means for converting said pair of output signals into a plurality of polyphase signals having a predetermined relative phase relationship comprise, a pair of transformers, and a resistance bridge network coupled to the outputs of said transformers.

4. The device of claim 1 wherein said means connected to said rectifying means for producing a single continuous signal in accordance with the least positive one of said plurality of rectified polyphase signals comprises an OR circuit.

5. The device of claim 1 wherein said means coupled to said last mentioned converting means for rectifying each of said plurality of polyphase signals comprise a plurality of half-wave rectifiers.

6. A broadband frequency multiplier comprising in combination, means for receiving an electrical signal and producing a pair of output signals therefrom having a ninety-degree relative phase relationship, means coupled to said last mentioned producing means for transforming said pair of output signals into eight polyphase signals successively phase displaced forty-five degrees throughout a three hundred and sixty degree phase angle, means coupled to said last mentioned transforming means for half-wave rectifying each of said eight phase displaced signals, means connected to said rectifying means for producing a single continuous signal that is proportional to the least positive voltage of said eight rectified phase displaced signals at any given instant, and means coupled to the aforesaid continuous single signal producing means for predeterminedly filtering the single continuous signal therefrom.

7. The invention according to claim 6 further characterized by a coupling capacitor interposed between the output of said single continuous signal producing means and the input of said filtering means.

8. A frequency multiplier comprising in combination, a single to two phase network, a two phase to polyphase network coupled to the output of said single to two phase network, a bank of half-wave rectifiers connected to the output of said two phase to polyphase network, and an "OR" circuit coupled to the output of said bank of half-wave rectifiers.

9. The device of claim 8 wherein said single to two phase network comprises a pair of three hundred sixty degree all-pass filters.

10. The device of claim 8 wherein said two-phase to polyphase network includes a signal mixing resistance bridge network.

11. A frequency multiplier comprising in combination, a single to two-phase network, a two-phase to polyphase network coupled to the output of said single to two-phase network, a bank of half-wave rectifiers connected to the output of said two-phase to polyphase network, an OR circuit coupled to the output of said bank of half-wave rectifiers, and a slope filter coupled to the output of the aforesaid OR circuit.

12. The device of claim 11 wherein said slope filter includes, an inductance and a resistor connected in series therewith.

13. A passive frequency multiplier for multiplying the frequency of an input electrical signal within a broad frequency range by a predetermined multiplication factor comprising in combination, a pair of three hundred sixty degree phase equalizers adapted for receiving said input signal, a pair of transformers respectively coupled to the outputs of said pair of phase equalizers, a resistance signal-mixing network coupled to the outputs of said pair of transformers, a plurality of half-wave rectifiers respectively connected to each of the outputs of said resistance signal-mixing network, and an OR circuit coupled to the outputs of said plurality of half-wave rectifiers.

14. The device of claim 13 wherein said OR circuit includes, a plurality of diodes the outputs of which are connected together, a ground, and a resistance means interconnecting said connected diode outputs and said ground.

15. A passive frequency multiplier for multiplying the frequency of an input electrical signal within a broad frequency range by a predetermined multiplication factor comprising in combination, a pair of three hundred sixty degree phase equalizers adapted for receiving said input signal, a pair of transformers respectively coupled to the outputs of said pair of phase equalizers, a resistance signal-mixing network coupled to the outputs of said pair of transformers, and a plurality of half-wave rectifiers respectively connected to each of the outputs of said resistance signal-mixing network, an "OR" circuit coupled to the outputs of said plurality of half-wave rectifiers, and a filter coupled to the output of said "OR" circuit.

16. A passive frequency multiplier for multiplying the frequency of an input electrical signal within a broad frequency range by a predetermined multiplication factor comprising in combination, a pair of three hundred sixty degree phase equalizers adapted for receiving said input signal, a pair of transformers respectively coupled to the outputs of said pair of phase equalizers, a resistance signal-mixing network coupled to the outputs of said pair of transformers, a plurality of half-wave rectifiers respectively connected to each of the outputs of said resistance signal-mixing network, an "OR" circuit coupled to the outputs of said plurality of half-wave rectifiers, a coupling capacitor connected to the output of said "OR" circuit, and a slope filter connected to the output of said coupling capacitor.

17. A method of multiplying the frequency of an electrical signal within a broad frequency band by a predetermined multiplication factor comprising the combination of steps, converting a single phase input signal into a pair of signals having a ninety degree relative phase relationship, transforming said pair of signals into a plurality of signals having predetermined evenly spaced phase relationships therebetween within a three hundred sixty degree phase angle, rectifying each of said plurality of signals, selecting and following the one of said rectified plurality of signals having the least positive potential, and filtering said selected and followed rectified signal having the least positive potential.

18. A method of passively multiplying the frequency of an input electrical signal that contains one or more frequencies within a broad frequency band by a multiplication factor of eight comprising the steps of, converting the input signal whose frequency is to be multiplied by eight from a single phase signal into a pair of signals having a ninety-degree relative phase relationship, transforming said pair of ninety-degree phase related signals into eight signals each of which is successively displaced forty-five degrees in an evenly spaced arrangement within a three hundred sixty degree phase angle, half-wave rectifying each of said eight signals, selecting and following the one of said eight rectified signals having the least positive potential, and filtering said selected and followed signal in accordance with a predetermined slope function.

19. A 360° phase equalizer circuit comprising in combination, a first tank circuit having a first inductance and a first capacitance connected in parallel therewith, a second tank circuit having a second inductance and a second capacitance connected in parallel therewith, a first series network having a third inductance and a third capacitance connected in series therewith, said first series network being connected between the input of said first tank circuit and the output of said second tank circuit, and a second series network having a fourth inductance and a fourth capacitance connected in series therewith, with said second series network being connected between the input of said second tank circuit and the output of the aforesaid first tank circuit.

References Cited by the Examiner

UNITED STATES PATENTS

| | | | |
|---|---|---|---|
| 1,831,516 | 11/1931 | Stewart | 332—42 |
| 1,843,521 | 2/1932 | Smith | 321—1 |
| 3,044,003 | 7/1962 | Stavis et al. | 332—21 |
| 3,162,819 | 2/1964 | Wintringham | 332—42 |

JOHN F. COUCH, *Primary Examiner.*

G. GOLDBERG, *Assistant Examiner.*